No. 662,336. Patented Nov. 20, 1900.
G. S. BAKER.
BISCUIT MAKING MACHINE.
(Application filed Aug. 29, 1900.)
(No Model.) 11 Sheets—Sheet 1.

FIG. 1

Witnesses
Inventor
George S. Baker
By his Attorney

No. 662,336. Patented Nov. 20, 1900.
G. S. BAKER.
BISCUIT MAKING MACHINE.
(Application filed Aug. 29, 1900.)

(No Model.) 11 Sheets—Sheet 4.

FIG. 4.

Witnesses
Inventor
George S. Baker
By Wm. E. Boulter
Attorney

No. 662,336.          Patented Nov. 20, 1900.
G. S. BAKER.
BISCUIT MAKING MACHINE.
(Application filed Aug. 29, 1900.)

(No Model.)                    11 Sheets—Sheet 5.

No. 662,336. Patented Nov. 20, 1900.
G. S. BAKER.
BISCUIT MAKING MACHINE.
(Application filed Aug. 29, 1900.)
(No Model.)
11 Sheets—Sheet 6.

Fig. 6.

No. 662,336. Patented Nov. 20, 1900.
G. S. BAKER.
BISCUIT MAKING MACHINE.
(Application filed Aug. 29, 1900.)
(No Model.) 11 Sheets—Sheet 8.

No. 662,336. Patented Nov. 20, 1900.
G. S. BAKER.
BISCUIT MAKING MACHINE.
(Application filed Aug. 29, 1900.)

(No Model.) 11 Sheets—Sheet 10.

Fig. 10.

No. 662,336. Patented Nov. 20, 1900.
G. S. BAKER.
BISCUIT MAKING MACHINE.
(Application filed Aug. 29, 1900.)
(No Model.) 11 Sheets—Sheet 11.

UNITED STATES PATENT OFFICE.

GEORGE SAMUEL BAKER, OF LONDON, ENGLAND.

BISCUIT-MAKING MACHINE.

SPECIFICATION forming part of Letters Patent No. 662,336, dated November 20, 1900.

Application filed August 29, 1900. Serial No. 28,413. (No model.)

*To all whom it may concern:*

Be it known that I, GEORGE SAMUEL BAKER, a subject of the Queen of England, residing at London, England, have invented certain new and useful Improvements in Biscuit-Making Machines, (for which application for patent has been made in Great Britain under No. 2,055, dated February 1, 1900,) of which the following is a specification.
This invention has for its object to provide an improved biscuit-making machine in which the unbaked material is carried through one or more sets of rollers, to which it is fed by means of conveyers, and is in a similar manner afterward passed through a cutting device which cuts the material into pieces, the shape of which varies according to the form of biscuit required to be made. These shaped portions of material are then carried from the cutter by means of a conveyer and deposited upon trays ready for baking. The scrap material from which the shaped portions have been cut is carried off by means of a separate conveyer before the shaped portions of the material are fed onto the trays.

In the accompanying drawings, which illustrate a machine constructed according to this invention,
Figs. 5, 6, 7, and 8 are consecutive views of the machine in plan, Fig. 5 being a plan view of that part of the machine shown in Fig. 1, Fig. 6 a similar view of that part of the machine shown in Fig. 2, and so on with the remaining figures consecutively.

Like numbers indicate like parts throughout the drawings.

Figure 6:
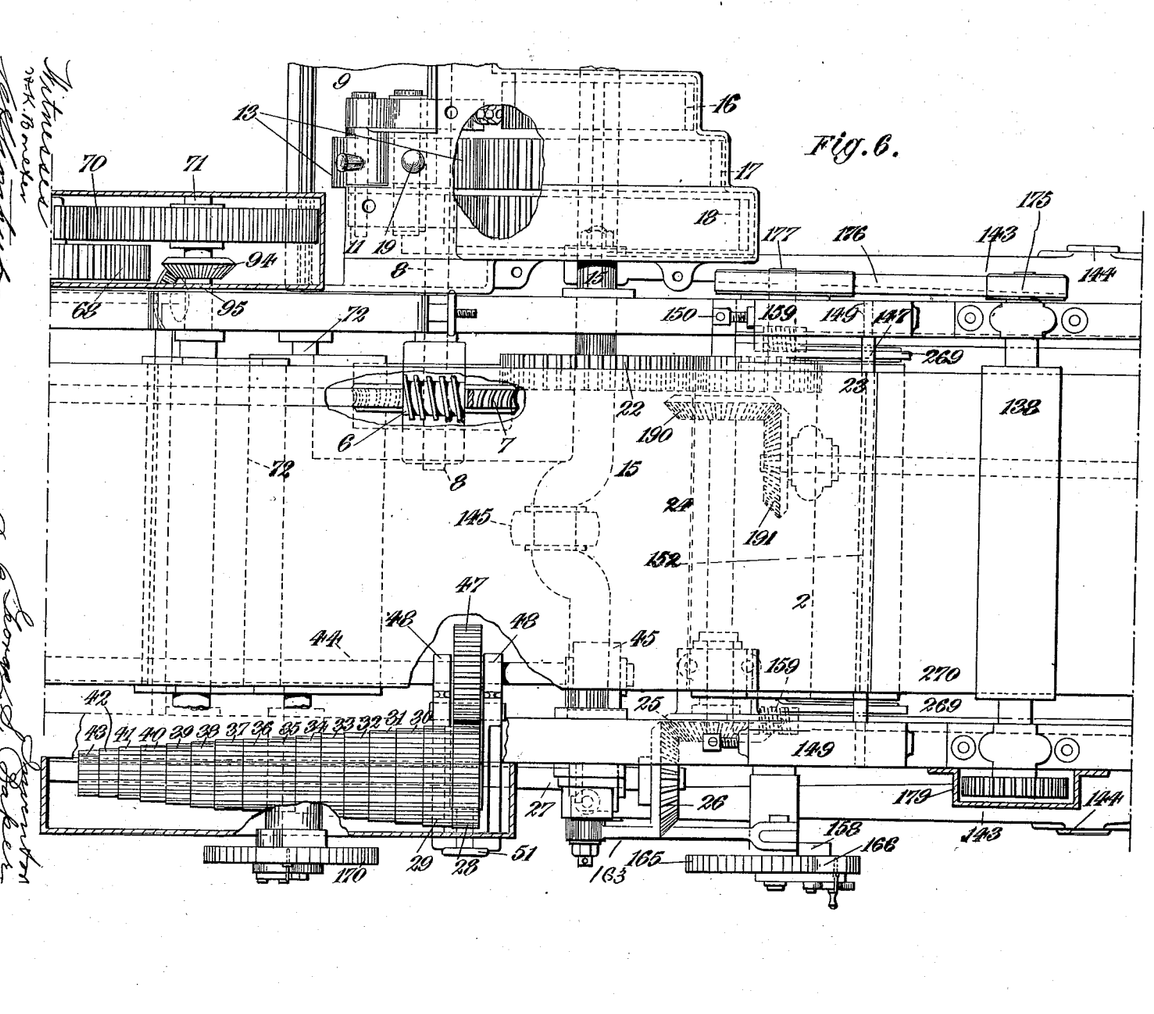
Figure 7:
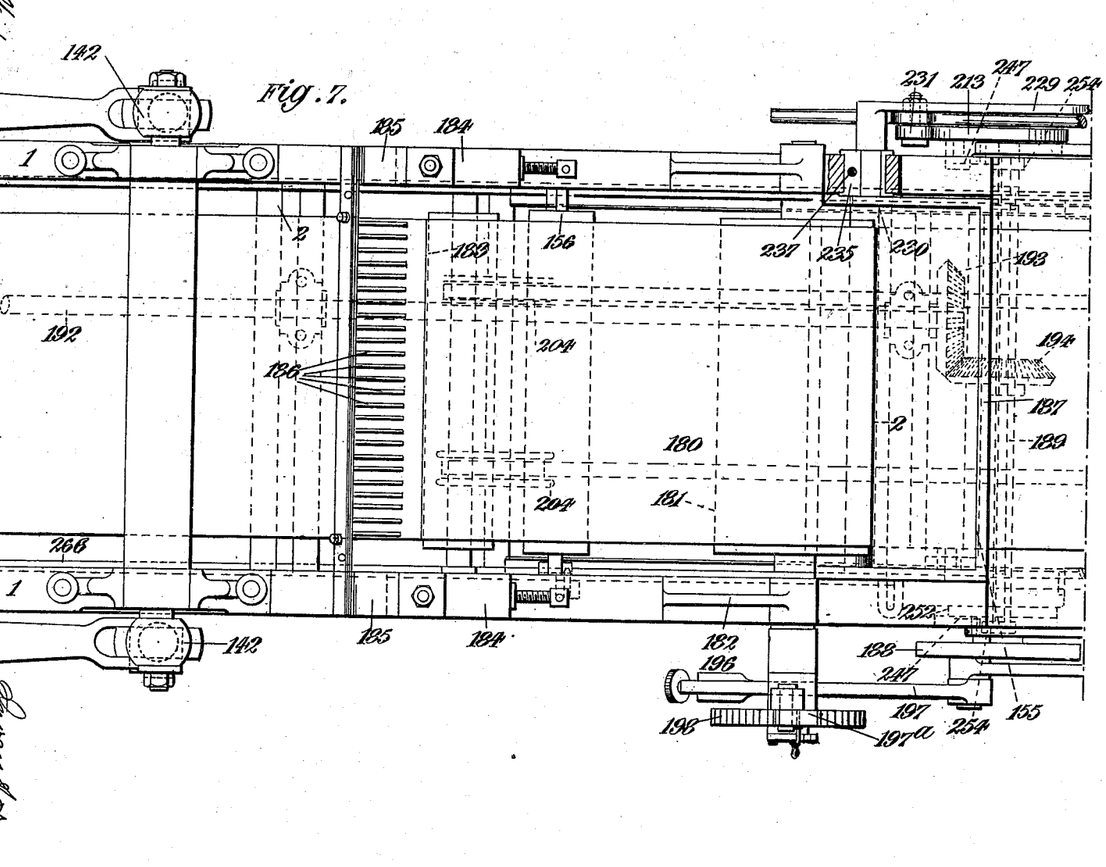
Figure 8:
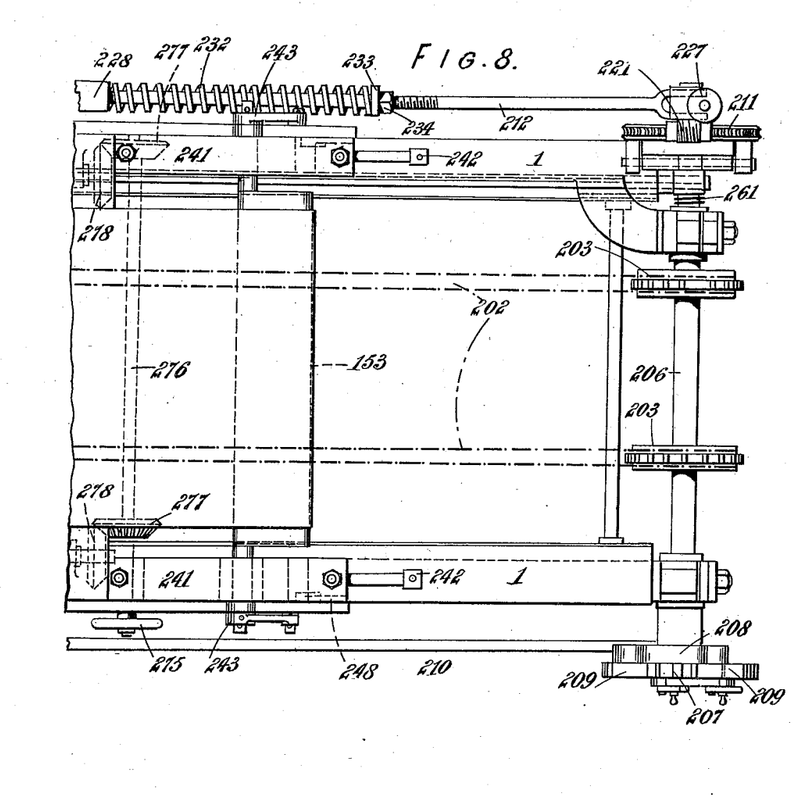
Figure 9:
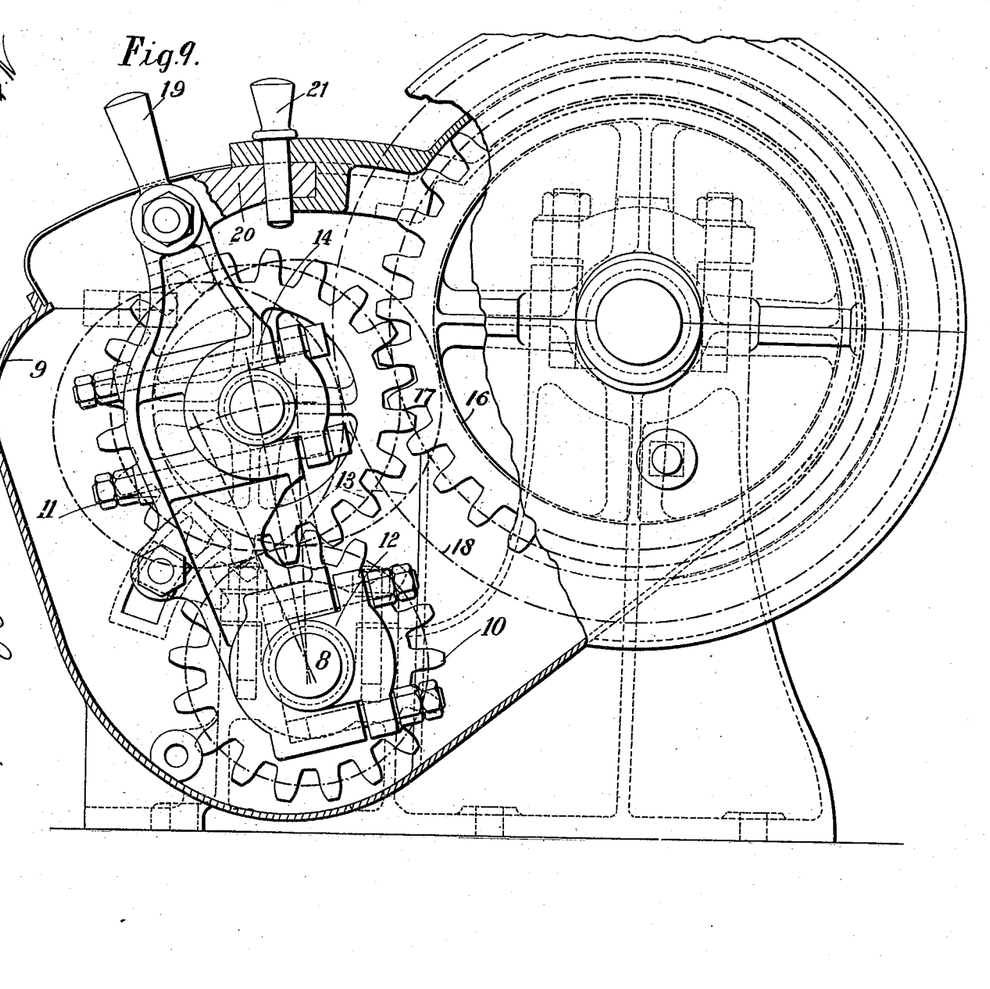
Fig. 9 is an elevation of part of the speed-gear of the machine, showing details of construction.
Figure 10:
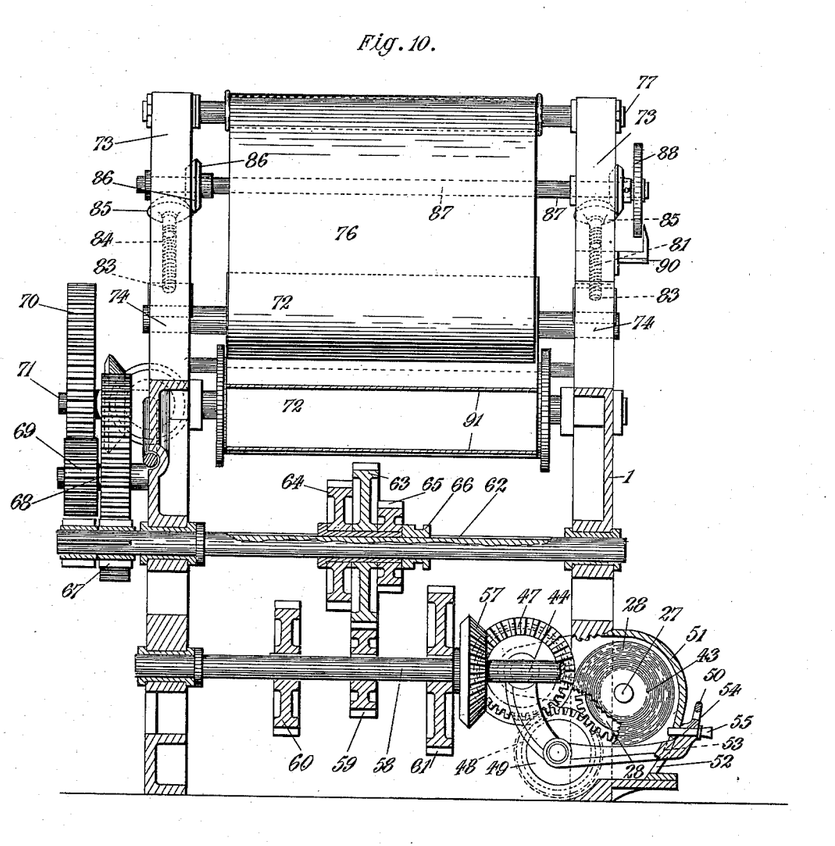
Fig. 10 is a transverse section of the machine on line 10 10 of Figs. 1 and 5.

The frame of the machine upon which all the different parts are carried comprises two longitudinal side members 1, rigidly secured together by transverse members 2, held in place by bolts 3. At one end of the machine is mounted an electric motor 4, which constitutes the source of power by which the machine is driven, although an oil-engine or any other power device may be used for this purpose. The motor 4 is connected by a longitudinally-arranged shaft 5 and worm and worm-wheel 6 and 7, respectively, to a transversely-arranged shaft 8. This shaft 8 is mounted in a box or casing 9, Figs. 6 and 9, secured to one of the longitudinal members 1 of the frame. Mounted upon this shaft 8, and free to slide upon it though compelled to rotate with it, is a toothed wheel 10, and pivoted to the same shaft is one end of a sling 11. The sling 11 is provided with a bearing 12, by which it is secured to the shaft 8, and comprises two side members, one of which is arranged on each side of the wheel 10. A toothed wheel 13 is carried in bearings 14, formed in the upper end of the sling 11 and is always in mesh with the toothed wheel 10. A crank-shaft 15 is mounted transversely in the frame members 1, one end of the shaft being extended through the box or casing 9 and provided with toothed wheels 16, 17, and 18, respectively, fast upon that portion which lies within the casing 9. The sling 11, with its toothed wheels 10 and 13, is free to slide upon the shaft 8, and the sling can be turned about the shaft so that the toothed wheel 13 may be brought into mesh with any one of the wheels 16, 17, and 18 on the crank-shaft 15. The sling is provided with a handle 19 and carries a projection 20, which may be secured to the casing 9 by a pin 21 when the wheel 13 is brought into mesh with the desired wheel upon the crank-shaft 15. The sling 11 is by this means retained in position so long as that particular speed is required. A toothed wheel 22 is mounted fast upon the crank-shaft 15 between the longitudinal members 1 of the frame and gears with a toothed wheel 23, carried by a shaft 24, supported by the frame members 1. The shaft 24 has mounted upon it at that end remote from the toothed wheel 23 a bevel-pinion 25, which gears with a bevel-pinion 26, carried by a shaft 27, arranged at right angles to the shaft 24. Fast upon the shaft 27 is mounted a "step gear-wheel," comprising a series of toothed wheels 28, 29, 30, 31, 32, 33, 34, 35, 36, 37, 38, 39, 40, 41, 42, and 43. Parallel to the shaft 27 is arranged a shaft 44, carried in bearings 45 46, secured to one of the frame members 1, and upon this shaft is mounted a gear-wheel 47, supporting a sling 48. The gear-wheel 47 is free to slide upon the shaft 44 in a longitudinal direction, but if rotated carries the shaft with it. The sling 48 is free to pivot about the wheel 47 or may be carried by and free to pivot about the shaft 44, but embraces the wheel 47 and slides with it. In the lower end of the sling is mounted a gear-wheel 49, Fig. 10, which is always in mesh with the wheel 47. The lower end of the sling is extended forwardly beyond the wheel 49 and is provided with a handle 50, by which it may be raised and lowered and moved sidewise upon the shaft 44, so that the wheel 49 may be brought into engagement with any one of the wheels forming the step gear-wheel upon the shaft 27. The whole of this gearing is conveniently inclosed in a casing 51, provided with an approximately horizontal slot 52, through which the handle of the sling extends. The slot 52 is of sufficient dimensions to permit the required movement of the sling 48 and is provided on one side with a series of recesses 53, one of each of which is arranged opposite one of the gear-wheels forming the step gear-wheel, and above each recess is an orifice or socket 54. When it is required to bring the wheel 49 into mesh with any one of the wheels 28 to 43, the sling is lowered so that it falls below the recesses 53, which are preferably formed upon the upper side of the slot 52, and slid along the shaft until opposite the wheel it is desired to bring into engagement. The sling is then raised so that it is brought into the recess which is opposite that gear-wheel. When in this position, the handle 50 will project over the orifice or socket 54 opposite that recess, so that a pin 55 may be passed through the handle and into the socket 54, thus retaining the sling and gear-wheel in position. By this means the shaft 44 may be driven at any one of the sixteen different speeds given by the step gear-wheel.

On one end of the shaft 44 is mounted a bevel gear-wheel 56 in mesh with a bevel gear-wheel 57, carried by a transverse shaft 58. Upon this shaft are mounted three gear-wheels 59, 60, and 61, respectively, and upon another shaft 62, arranged parallel to the shaft 58, are mounted three corresponding gear-wheels 63, 64, and 65. The gear-wheels 63, 64, and 65 are mounted close to each other and are free to slide upon the shaft 62, though forced to carry the same with them if rotated. The wheels on each shaft are of different dimensions and are so arranged that when those upon the shaft 62 are in the central position the largest wheel 63 upon that shaft is brought into mesh with the smallest wheel 59 upon the shaft 58. If now the wheels 63, 64, and 65 are moved to the right-hand end of the shaft 62, Fig. 10, the smallest wheel 65 will be brought into engagement with the largest wheel 61 upon the shaft 58. In the same manner if these wheels are moved to the left-hand end of the shaft 62 the medium-sized wheel 60 and 64 will be brought into mesh. A clutch-ring 66 is shown secured to the wheels 63, 64, and 65 and any convenient operating device may be arranged to engage this ring for the purpose of sliding the wheels upon the shaft.

It will be seen that by means of the speed-gear comprising the wheels 16, 17, and 18 upon the crank-shaft 15 and the wheels 28 to 43 upon the shaft 27, and in addition to these the wheels last described mounted upon the shafts 58 and 62, the shaft 62 may be made to rotate at any one of one hundred and forty-four different speeds. The shaft 62 is carried through the frame member 1 at one end and provided with a pinion 67, by means of which it is geared, through a train of gear-wheels 68, 69, and 70 to a shaft 71, mounted parallel to the shafts 62 and carrying the lower roller of a pair of rolls 72. The rolls 72 are carried in vertical supports 73, secured to the side members 1 of the frame of the machine. The journaled ends 74 of the upper rolls slide in slots 75 in the supports 73, the roller itself being supported by side supporting-springs, which always keep the roll-bearings against the upper part of its side bearings. A band 76 passes around the roller and over rollers 77 78 on the supports 73. The roller 78 is carried in movable blocks 79, arranged to slide in slots 80 in the supports 73. The sliding blocks are provided with a screw-threaded spindle 81 and nut 82, so that by revolving the nut 82 the blocks may be brought nearer to or farther from the roller 77, regulating the tension of the band to suit the adjustment of the upper roller of the rolls 72. To keep the upper roller rigidly at the required distance from the lower roller, blocks 83 are made to press upon the journaled ends of the roller by means of screw-threaded spindles 84, and the journal ends are held firmly against these said blocks by side spiral springs. The screw-threaded spindles 84 are rotated by means of bevel-wheels 85 and mesh with bevel-wheels 86, carried by a transverse shaft 87. The shaft 87 is provided with a hand-wheel 88, which is conveniently provided with a scale 89 and an indicator 90. The position of the scale 89 relatively to the indicator 90 will by this means serve to show the distance at which the upper roller is set from the lower roller of the rolls 72.

The material is served to the rolls 72 by means of a conveyer 91, carried at one end by a drum 92 and at the other end by a "knife-edge," which may conveniently comprise a small roller 93, around which the conveyer turns. In order that the tension of the conveyer may be regulated, the roller 93 may be carried in adjustable blocks arranged as hereinafter described, or the tension of the conveyer may be adjusted by any suitable tightening-gear. The conveyer 91 is driven from the shaft 71 of the rolls 72 by means of bevel gear-wheels 94 95, shaft 96, and bevel gear-wheels 97 98, which last gear-wheel is mounted upon one end of a coned pulley 99, operatively connected by a belt 100 with a second coned pulley 101, geared to the drum 92 of the conveyer by means of toothed gear-wheels 102 103. The belt 100 is kept in position or moved in a longitudinal direction along the coned pulleys 99 101 for varying the speed of the conveyer by means of a belt-shifter 104, carried by a screw-threaded spindle 105 and plain spindle 105', provided with a hand-wheel 106. These said spindles 105 and 105' are mounted in the frame of the machine in such a manner that they cannot move endwise, so that when spindle 105 is revolved by means of the hand-wheel 106 the belt-shifter is made to travel backward or forward upon it, carrying with it the belt. In order that the belt 100 may be kept tight, the roller 101 is carried in a sling 107, conveniently suspended from the shaft which carries the drum 92 of the conveyer 91. The position of the sling is adjusted by a screw-spindle 108, one end of which is fixed to the frame of the machine. Upon the other end of the screw-threaded spindle 108 is mounted a nut 109, which bears against the sling, so that when revolved in one direction or the other the sling is made to swing about the shaft which carries the drum 92, so that the coned pulley 101 is brought nearer to or farther from the pulley 99 and the belt 100 slackened or tightened.

In some cases it is desirable to pass the material through a preliminary set of rolls before passing it through the rolls 72. For this purpose a set of rolls 110 is arranged upon the frame of the machine in advance of the rolls 72 with their conveyer 91. This set of rolls is constructed in exactly the same manner as the rolls 72, so that it is unnecessary to further describe them in detail. The lower roll in this case is carried by a shaft 111, which is driven by means of gear-wheels 112, 112ª, and 113 from a pinion 114, fast upon the shaft 62. The material is served to this set of rolls by means of a conveyer 115. This conveyer, as in the case of the conveyer 91, is supported at one end by a drum 116 and at the other end by a knife-edge or roller 117. The roller 117 in this case is fixed, but the drum 116 is carried in blocks 118, arranged to slide in slots 119 in the side members 1' of the dough-table, the position of the blocks being adjusted by screws 120, so that by moving the blocks backward or forward within the slots 119 the conveyer 115 may be tightened or slackened. The drum 116 is driven through the medium of gear-wheels 121 122, the wheel 122 being mounted upon a coned pulley 123, operatively connected by a belt 124 with a coned pulley 125, which in turn is driven from the shaft 111 through the medium of toothed wheels 126 127, respectively. The belt 124 is provided with a belt-shifter 128, constructed in the same manner as belt-shifter 124, already described, and the coned pulley 123 is carried in an adjustable sling 129, constructed in the same manner as the sling 107, by which the coned pulley 101 is carried.

The gear-wheels 112ª and 113 are carried in a casing 130, supported at one end central to the shaft 111, about which it is free to pivot centrally, and at the other end by a block or lug 131, free to slide in a slot 132 in the adjacent side member 1 of the frame of the machine. The block 131 is secured to a screw-threaded spindle 133, carried in a nut 134, which is fast to the frame of the machine. The end of the screw-threaded spindle 133 is provided with a hand-wheel 135, by means of which it may be rotated, so that a smaller or greater portion of the spindle is advanced through the nut and the block or lug 131 of the casing 130 thus brought nearer to or farther from one end of the slot 132. When the block is in the position in the slot shown in the drawings, the gear-wheel 113 is brought into mesh with the pinion 114 on the shaft 62; but when the block is withdrawn from the position indicated the wheel 113 is made to fall away from the pinion 114, so that the rolls 110, with the conveyer 115, are thrown out of operation.

The material from the rolls 72 is carried by a conveyer 136, from which it is delivered onto another conveyer 137. This conveyer carries it through a pair of rolls 138 to a cutting device 139. The cutter of this device, which may be of any well-known construction, is secured to a block 140, adapted to slide in vertical guides 141. The block 140, with its cutter, is reciprocated in the guides 141 by means of two connecting-rods 142, arranged one on each side of the machine. These connecting-rods 142 are secured by their free ends to rocking levers 143, arranged outside the side frame members 1 and pivoted thereto at 144. The ends of the rocking levers 143, remote from the connecting-rod 142, are connected together by a transverse rod, by means of which the members are operatively connected to the crank of the shaft 15 through the medium of a connecting-rod 145. By this means the cutter of the cutting device 139 is made to rise and fall once every revolution of the crank-shaft 15.

As it is necessary that the material shall be stationary while the cutter is actually in contact with it, the conveyers 136 and 137 are propelled forward by a step-by-step movement and coöperate with the cutter in such a manner that while the cutter is in contact with the material no movement of these conveyers is taking place. The conveyer 136 is carried at one end by a drum 146, mounted in suitable bearings upon the frame of the machine, while the other end is carried by a knife-edge or roller 147, as described with reference to the other conveyers referred to. In order that the tension of this conveyer may be regulated, the roller 147 is carried in sliding blocks 148, each mounted in a suitable carriage 149. The carriages 149 are secured to the side frame members 1, and each block is provided with an adjusting-screw 150, by which it may be moved farther from or nearer to the drum 146, thus adjusting the tension of the conveyer. The return or inoperative side of the conveyer 136 is for convenience carried over a guide 151.

The device described here for regulating the tension of the conveyer 136 is of the kind referred to with reference to the conveyer 91, which for the sake of clearness in the drawings is in that case omitted.

The conveyer 137 is carried at one end by a drum 152, mounted in a similar manner to the drum 146, and at the other by a movable knife-edge 153, hereinafter fully described. This conveyer or conveyer-band 137 passes between the rolls 138, through the cutting device 139, over a guide 154, around the knife-edge 153, and is returned over pulleys or rollers 155, 156, and 157 (by means of which it is kept clear of other working parts of the machine) to the drum 152.

Mounted upon the shaft by which the drum 152 is carried is a rocking member 158, free to pivot about the shaft upon which it is mounted. The member 158 is provided at each end with guides or slots 159, within which are carried blocks 160. These blocks are connected by any well-known means to milled heads 161, by means of which when the latter are rotated the blocks are raised or lowered in the slots 159.

Fast upon the crank-shaft 15 is a slotted crank 162, carrying a sliding-block to which a link 163 is secured. The position of the sliding block in the slotted crank 162, and thus the amount of eccentricity given to that end of the link 163 which is secured to the crank, may be regulated by a milled head 164, coöperating with the sliding block in any well-known manner. The free end of the link 163 is pivoted to the lower block 160 of the rocking member 158. Fast upon the shaft which carries the drum 152 is mounted a ratchet-wheel 165, and the rocking member 158 carries a pawl 166, adapted to engage the teeth of this ratchet. The upper block 160 has secured to it one end of a connecting-rod 167, the other end of which is secured to a rocking lever 168, free to pivot about the shaft upon which the drum 146 of the conveyer 136 is mounted. This rocking lever 168 is also provided with a pawl 169, adapted to engage the teeth of a ratchet 170, mounted fast upon the shaft of a drum 146. By means of this mechanism every revolution of the crank-shaft 15 will cause the rocking member 158 and rocking lever 168 to be reciprocated backward and forward once, so that the pawls 166 and 169 will each move their respective ratchets forward a given distance. By raising or lowering the position of the sliding block carried in the slotted crank 162 or the blocks 160 carried in the rocking member 158 the throw of the pawls 166 and 169, respectively, may be varied. Loose on the shaft of each ratchet is mounted an arm 170, having a slot 171, which engages a pin on the pawl. Each arm carries a subsidiary arm 172, pivoted to it at one end. The free end of the subsidiary arm is notched at 173, so that when either pawl is not required to operate it may be raised out of engagement with the ratchet and the notched end 173 of the subsidiary arm brought beneath it, so that it is kept out of engagement and does not operate the ratchet.

The rolls 138 comprise upper and lower rollers, the distance of the upper from the lower being adjusted by a hand-wheel 174, connected to the roller by any well-known device. The lower roller carries at one end a pulley 175 and is connected by a belt 176 to a second pulley 177, fast on the shaft which carries the drum 152 of the conveyer 137. By this means the lower roller is driven, and the upper roller is driven from the lower by means of toothed gear-wheels 178 179. The rolls 138 adjust the thickness of the material as it passes to the cutter, and when the material issues from the cutter it is divided into a series of shaped portions arranged in rows upon the conveyer-band 137, each shaped piece being surrounded by the scrap material which has been separated from it. To remove this scrap material, a separate conveyer 180 is arranged above the conveyer 137. One end of this conveyer is carried by a drum 181, mounted upon a suitable support 182, secured to the frame of the machine, while the other end is carried by a knife-edge 183, mounted in the same manner as that of the conveyer 136 in an adjustable device 184. Secured to the device 184 is a bracket 185, carrying a series of curved fingers or prongs 186, which press lightly upon the material as it passes under them. The knife-edge of the conveyer 180 is raised sufficiently above the conveyer 137 to allow the material to pass under it; but the scrap material is in the first instance raised by hand and placed over the knife-edge, and thus continues to be carried up by the conveyer 180, leaving the shaped portions of the material upon the conveyer 137. The scrap material passes over the end of the conveyer 180 and falls into a receptacle 187.

The drum 181 of the conveyer 180 is driven by a step-by-step movement from a crank-disk 188, mounted fast upon a shaft 189. This shaft is driven from the shaft 24 by means of bevel-wheels 190 191, shaft 192, and bevel-wheels 193 194. The crank-disk 188 carries a crank-pin 195, connected to a rocking lever 196 by means of a connecting-rod 197. The rocking lever 196 carries a pawl and adjusting device, as described with reference to the rocking member 158. The pawl 197ª of the rocking lever 196 engages a ratchet 198 in exactly the same manner as the pawl of the rocking member 158, which is provided with an arm 199 and catch 200, corresponding to the arm 170 and catch 172 of the rocking member 158.

Figures 11, 12:
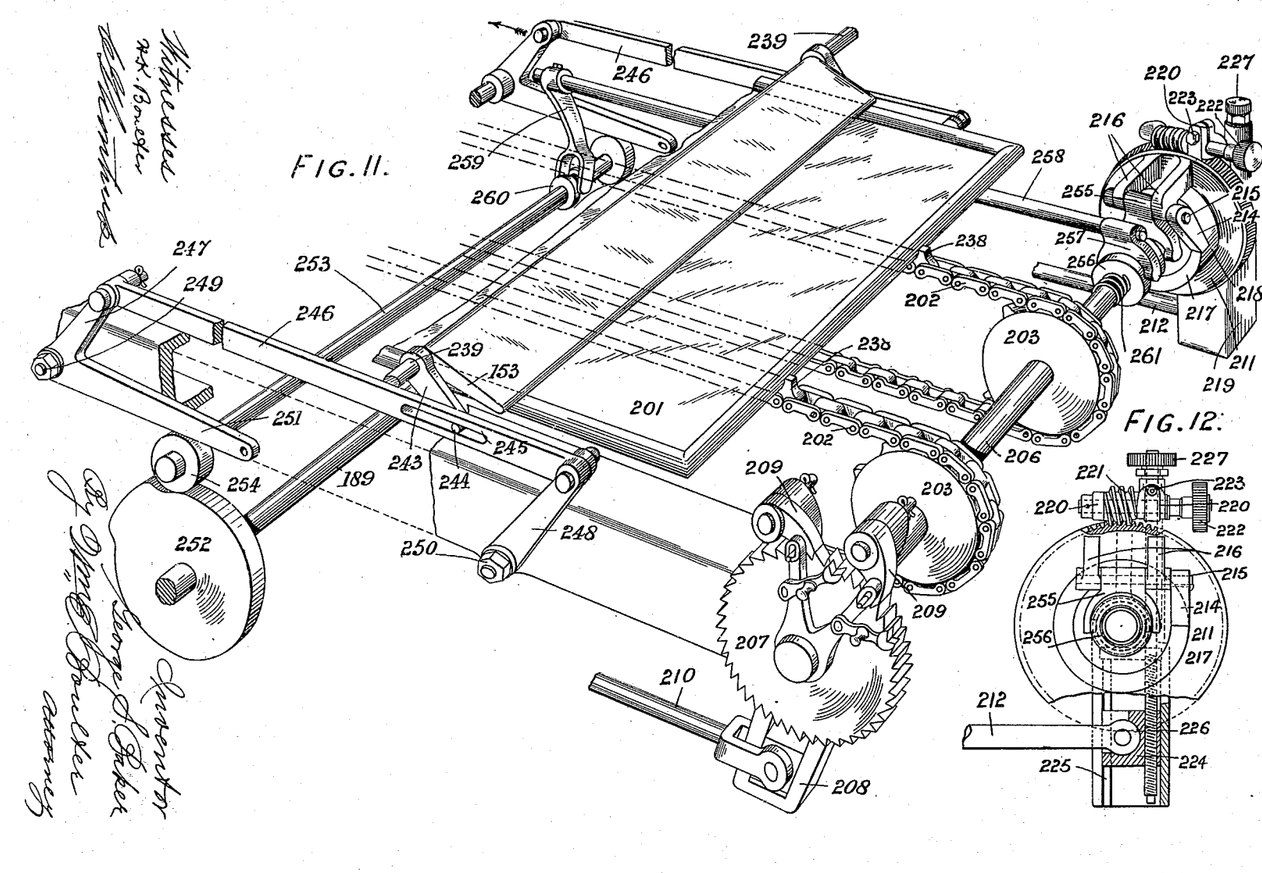
Fig. 11 is a perspective view of the mechanism shown on the right-hand side of Figs. 4 and 8, illustrating the details of construction of this part of the machine.
Fig. 12 is a detail view of the construction of a portion of the mechanism illustrated in Fig. 11.

The conveyer 137 delivers the shaped material upon it from the knife-edge 153 onto a series of traveling trays 201, Fig. 11. The trays 201 are carried upon chains 202, which in turn are carried by chain-wheels 203 and 204, respectively. The chain-wheels 204 are carried by a shaft mounted in adjustable bearings 205, arranged in the side members 1 of the framing of the machine. The chain-wheels 203 are carried by a shaft 206, mounted in suitable bearings at the end of the frame of the machine. The shaft is driven by means of a ratchet 207, a rocking lever 208, carrying pawls 209, and connected by a connecting-rod 210 to the crank-pin 195 of the crank-disk 188. This mechanism for driving the shaft 206, which is exactly similar to that already described for imparting a step-by-step movement to the conveyers 136 to 137, imparts a regular step-by-step movement to the trays. In addition to this regular step-by-step movement of the trays 201, which is synchronous with the step-by-step movement of the conveyer 137, it is necessary to impart to them an additional movement at the moment one tray is passing from under the knife-edge 153 of the conveyer 137 and the next tray is coming into position beneath it. The mechanism for imparting this additional movement comprises a disk 211, mounted free upon one end of the shaft 206 and reciprocated by means of a rod 212, operated by a cam 213, conveniently mounted upon the same shaft as the crank-disk 188. On the face of the disk 211 is mounted a pawl 214, carried upon a spindle 215, mounted in brackets 216, integral with or secured to the disk 211. Fast upon the shaft 206 is a sleeve 217, having a recess 218, adapted to be brought into the path of the pawl at intervals as the latter reciprocates with the disk 211. So long as the sleeve 217 is not in such a position relatively to the pawl that its recess coincides with the pawl, the pawl as it reciprocates will slide upon the face of the sleeve, but the moment the step-by-step movement of the shaft brings the recess 218 into the path of the pawl the latter will drop into it under the action of a spring hereinafter described. The pawl will then engage the sleeve and carry it around with the shaft 206 during the forward reciprocation of the disk 211.

In order that the moment at which the pawl 214 engages the sleeve 217 may be adjusted, the block 219 carries supports 220, in which is mounted a worm 221, having a milled head 222, by means of which it may be revolved. The worm engages the periphery of the disk 211, which is made in the form of a worm-wheel and forms the only connection between it and the reciprocating block 219. By revolving the worm 221 it is obvious that the disk 211 will be rotated about the shaft 206 and the path in which the pawl 214 will reciprocate varied. When the position of the pawl has been satisfactorily adjusted, the worm may be secured by tightening a bolt 223. The end of the rod 212, secured to the block 219, may be attached to a movable block 224, arranged to slide in guides 225, within the block 219, so that the end of the rod 212 may be brought nearer to or placed farther from the center of the shaft 260. The block 224 is engaged by a screw-threaded spindle 226, having a milled head 227, by which it may be rotated when it is desired to raise or lower the block 224 in its guides. By regulating the distance of the block 224 from the center of the shaft 206 it is obvious that the distance through which the disk 211 with its pawl 214 is reciprocated may be regulated.

To allow of still further adjusting the moment at which the pawl 214 engages the sleeve 217, that end of the rod 212 remote from the disk 211 is passed through a sliding bearing 228, carried at one extremity of an arm 229. The end of the arm 229 remote from the bearing 228 is pivoted upon a pin 230 to one of the side members 1 of the frame of the machine. The end of the rod 212 extends beyond the sliding bearing 228 and beyond the cam 213, by which the rod is operated. Fast to the rod on that side of the cam remote from the disk 211 is mounted a roller 231, which is kept in engagement with the cam by means of a spring 232, bearing at one end against a washer 233 and nut 234 upon the rod 212 and at the other end against the end of the sliding bearing 228. The pin 230 is not secured direct to the frame, but is carried in a block 235, sliding in guides 236, within which it may be raised or lowered by an adjusting-screw 237. The pin 230 is free to turn within the block, so that as the block is raised or lowered in the frame the arm 229 may always be kept in line with the rod 212. The end of the rod 212 remote from the reciprocating block 219 is preferably carried through the pin 230 and that end of the arm 229 which passes through the pin, so that a better sliding bearing is provided for the rod than would be the case if it were supported only by the bearing 228. The object of allowing the adjustment of the block 235 is that by this means the roller 231 is raised or lowered relatively to the cam 213, so that the period at which the cam will operate the rod 212 may be advanced or retarded.

The trays 201 are conveniently carried upon the chains 202 between projections 238, Fig. 11. As one tray is brought from under the knife-edge 153 of the conveyer 137 and another placed in positions beneath it, it is desirable that the knife-edge should be raised, so that it may not strike the edge of either of the trays or the projections 238, as any such shock imparted to the conveyer would tend to derange the cut material upon its surface. The knife-edge is carried by means of pins 239 in adjustable blocks 240, mounted in carriages 241 and provided with adjusting-screws 242 in a similar manner to the adjusting device described with reference to the conveyer 136. The knife-edge in this case, however, is not in the form of a roller, but in the form of a wedge-shaped flap. The pins 239 are secured in the thickest side of the wedge-shaped knife-edge 153, and the whole flap or knife-edge is free to turn with these pins in the adjustable blocks 240. Secured to the pins 239 are levers 243, each carrying a pin 244, engaging a slot 245 in a rod 246. The rod 246 is carried by arms 247 248, pivoted at 249 and 250 to the frame of the machine. The arms 247 are each provided with an extension 251. The extensions 251 of the arms 247 project over the shaft 189, which carries the cams 188 and 213, respectively, and upon this shaft and immediately beneath the extensions 251 are mounted cams 252. Parallel with the shaft 189 and vertically above it is mounted a sliding shaft 253, carried in any convenient form of bearings upon the frame of the machine. The shaft 253 carries at each end a roller 254, adapted to be inserted between the cams 252 and extensions 251 of the arms 247 when the cams are required to operate these arms. The spindle 215 of the pawl 214, carried by the reciprocating disk 211, has secured to it an arm 255, which engages a double clutch-ring 256, free to slide upon the shaft 206. Engaging with the same clutch-ring is an arm 257, carried by a shaft 258, supported by any convenient means from the framing of the machine. Secured to the shaft 258 at that end remote from the arm 257 is an arm 259, engaging a clutch-ring 260, mounted fast upon the shaft 253. So long as the pawl 214 slides upon the face of the sleeve 217 on the shaft 206 the arms 255, 257, and 259 are kept in such a position that the rollers 254 upon the sliding shaft 253 are not allowed to come between the cams 252 and extensions 251 of the arms 247; but the moment the pawl 214 drops into the recess 218 of the sleeve 217 the clutch-ring 256 will be moved toward the disk 211 by means of a spring 261, one end of which bears against the clutch-ring and the other against the shaft 206. This movement of the clutch-ring 256 will cause a movement of that end of the arm 257 with which it is in engagement, so that the shaft 258 will be partly rotated. This partial rotation of the shaft 258 will cause a movement of the arm 259, so that the sliding shaft 253 will be moved longitudinally and the rollers 254 brought between the cams 254 and extensions 251 of the arms 247. This movement of the sliding shaft 253 necessarily takes place at the moment one tray is about to be moved under the knife-edge 153 and another brought into its place, as it is operated by the pawl dropping into the recess 218, by means of which this additional forward movement of the trays is effected. The cams 254 are timed, so that their operative portions are passing beneath the extensions 251 of the arms 247 at this moment. As the operative portions of the cams come into contact with the rollers 254, the rollers will be raised, thus raising the ends of the extensions 251 and turning the arms 247 about their pivots 249.

Figure 1:
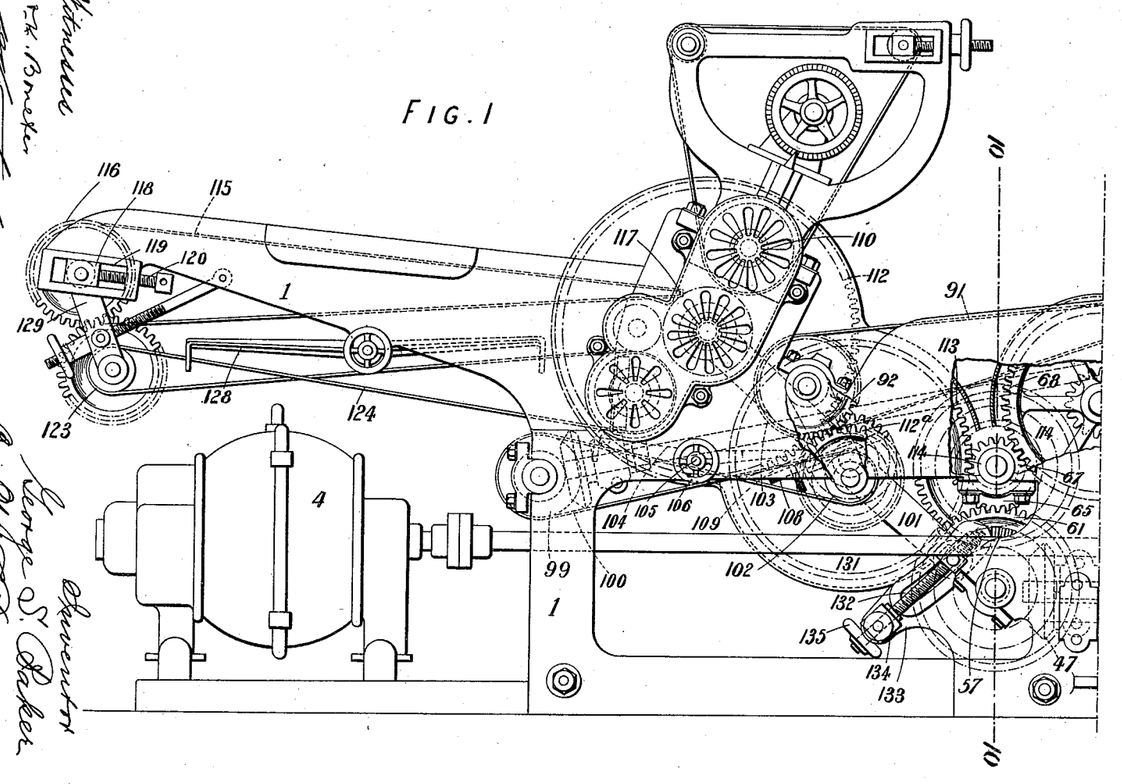
Figures 1, 2, 3, and 4 are consecutive views of the machine in elevation.
Figure 2:
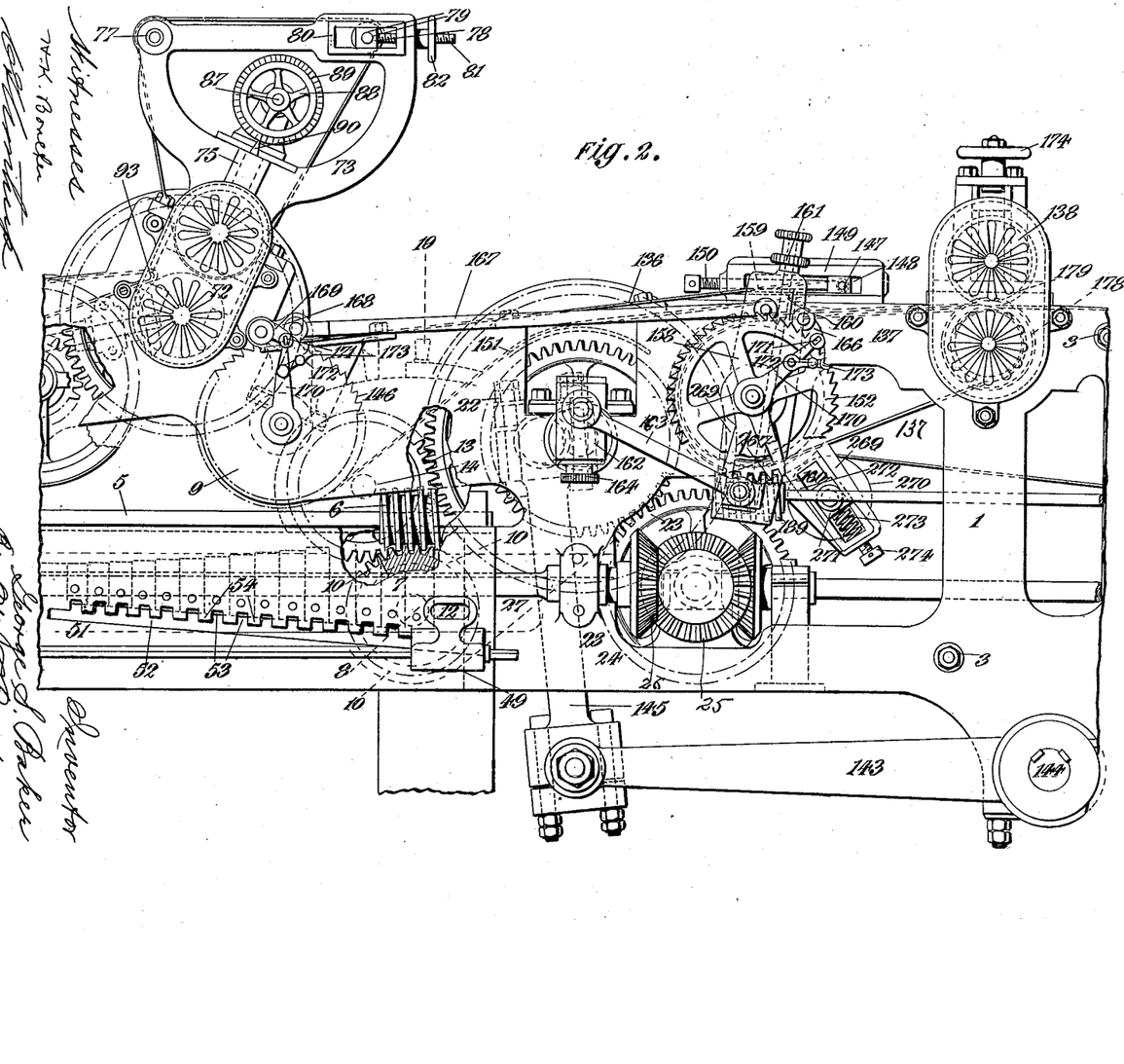
Figure 3:
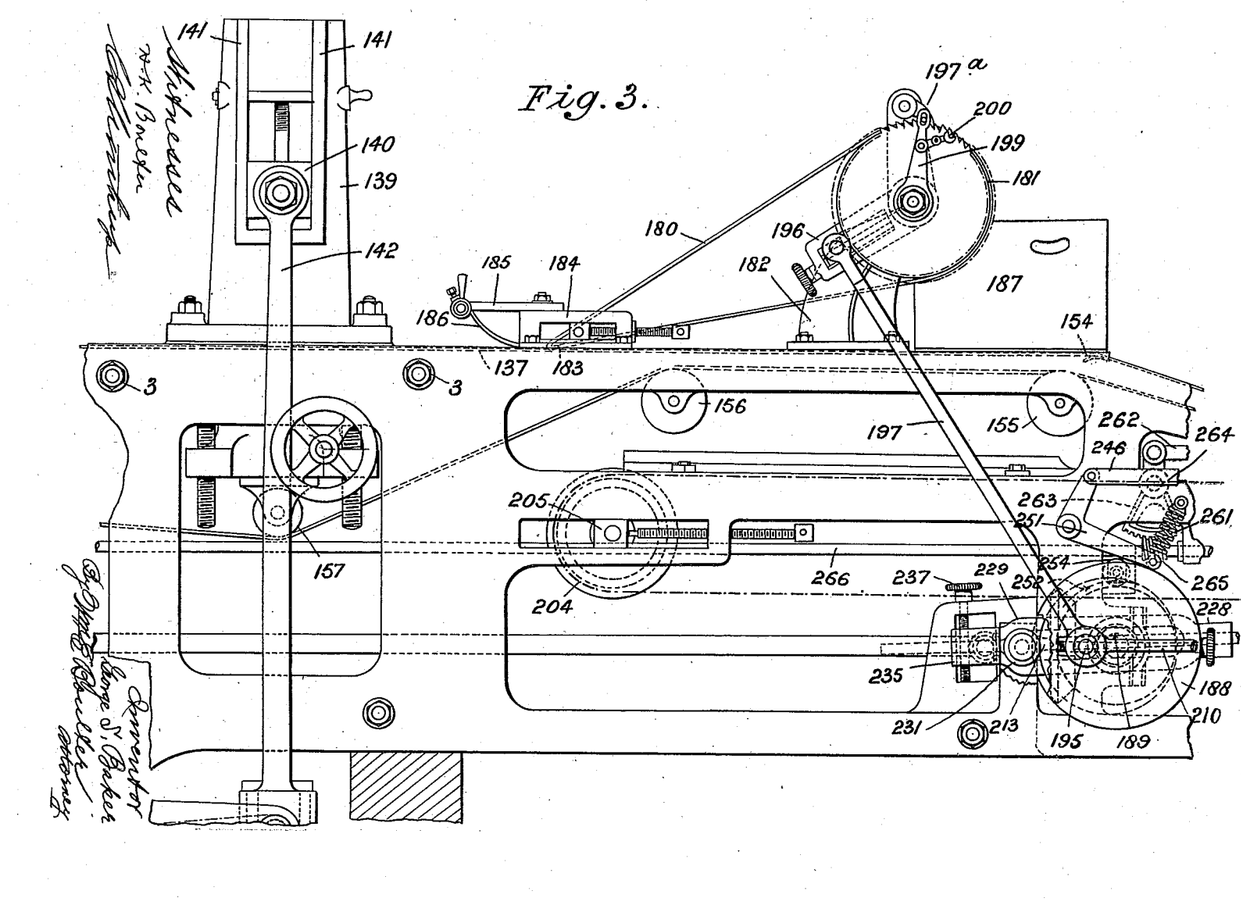
Figure 4:
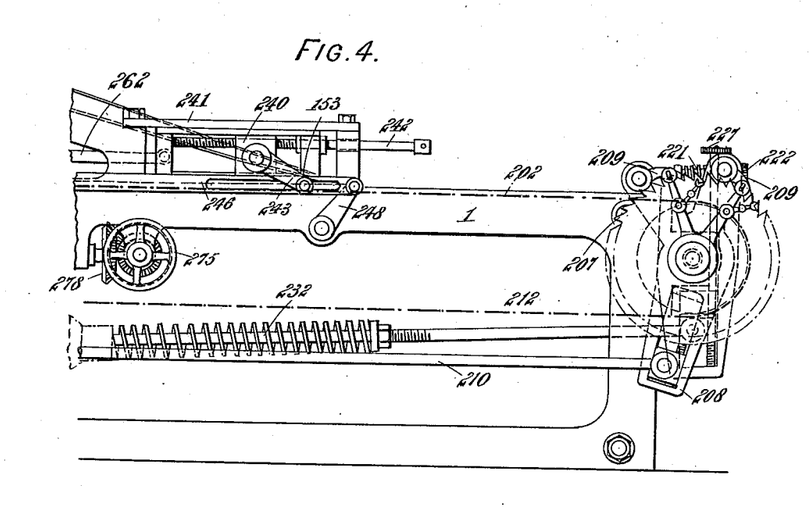
Figure 5:
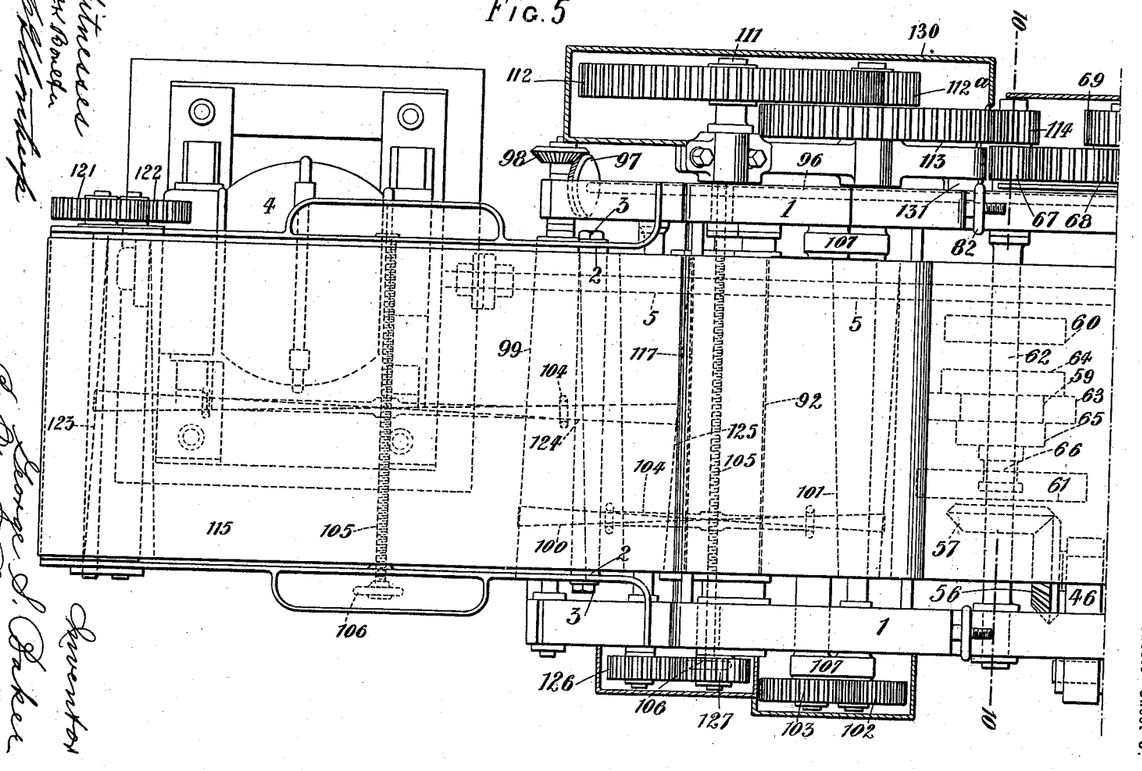

The movement of the arms 247 will be communicated by means of the rods 246 to the arms 248, so that the rods 246 will rise with a parallel movement, carrying with them the levers 243, with which they are in engagement by means of the pins 245. The raising of the levers 243 will obviously cause the flap or knife-edge 153 to be rotated about its pins 239 in the adjustable blocks 240, so that the thin edge of the wedge-shaped flap, which normally is lower than the thick edge, will be raised sufficiently to allow the projections 238 and edges of the trays 201 to pass beneath without coming into contact with it. To insure the return of the knife-edge 153 to its normal position after having been raised by the cams 252, the extensions 251 of the arms 247 are connected to the frame of the machine by springs 261, (Fig. 3, one only being shown,) which normally depress the end of the extensions 251 remote from the pivots 249. It is obvious that the spring 261, in addition to operating the sliding shaft 253 by moving the clutch-ring 256 when the pawl 214 drops into the recess 218, also serves to make the pawl drop into the recess by maintaining a continual pressure upon the arm 255.

The tension of the conveyer-band 137 is regulated by moving the knife-edge nearer to or farther from the roller 152 by means of the adjustable blocks 240 in the carriages 241. It, however, sometimes occurs that when the tension of the band is properly regulated its length is such that at the completion of one of the step-by-step movements by which the conveyer travels one row of cut material may be left projecting from the delivery edge of the conveyer in such a manner that the next forward movement may derange the row in depositing it upon the trays 201. To avoid this difficulty, means are provided by which the length of the conveyer-band may be regulated without altering its tension. Each carriage 241 is made to slide upon the frame of the machine and is connected by a link 262 to one end of a quadrant 263. The quadrants are pivoted at 264 to the frame and gear with worms 265, carried by longitudinally-arranged shafts 266, supported by suitable bearings from the frame of the machine. At each end of the shafts 266, remote from the quadrants 263, is a second worm 267, gearing with a quadrant 268, made integral with or secured to an arm 269, conveniently suspended from the shaft by which the drum 152 of the conveyer-band 137 is carried. The arms 269 are free to pivot about the shaft by which they are supported and carry a jockey pulley or roller 270, which bears against the inoperative portion of the conveyer-band 137 as it comes onto the drum 152. In order that the jockey pulley or roller 270 may bear against the conveyer-band with an even pressure, it is mounted in sliding blocks 271, carried in guides 272 in the arms 269, the blocks being urged toward the pivoted ends of the arms by means of springs 273. The tension of the springs 273 may be adjusted by set-screws 274. From this description it is obvious that if the shafts 266 are rotated in such a direction as to cause the lower ends of the quadrants to move to the right the carriages 241 of the knife-edge 153 will be moved to the left and the jockey-pulley 270 will be raised, thus shortening the operative portion of the conveyer-band 137 and taking up the slack by means of the jockey-pulley 270, so that the tension of the band remains unaltered.

To operate the shafts 266, a hand-wheel 275 is provided, conveniently geared to the shafts by means of a spindle 276 and bevel gear-wheels 277 278.

What I claim as my invention, and desire to secure by Letters Patent, is—

1. In a biscuit-making machine the combination of, a source of power, rolls operated from that source of power, conveyers serving material to the rolls and driven from the same source of power, means for varying the speed of the rolls, means for varying the speed of the conveyers, a cutter, means for operatively connecting the cutter with the source of power, a conveyer for serving material from the rolls to the cutter and carrying it from the same, means for propelling this conveyer from the source of power, a series of traveling trays coöperating with this conveyer, mechanism operatively connecting the trays with the source of power, and means for imparting additional movement to the trays as one tray passes from under the delivery end of the conveyer and another comes into its place, substantially as set forth.

2. In a biscuit-making machine the combination of, a source of power, rolls operated from that source of power, conveyers serving material to the rolls, and driven from the same source of power, means for varying the speed of the rolls, means for varying the speed of the conveyers, a cutter, means for operatively connecting the cutter with the source of power, a conveyer for serving material from the rolls to the cutter and carrying it from the same, means for propelling this conveyer from the source of power, a series of traveling trays coöperating with this conveyer, mechanism operatively connecting the trays with the source of power, means for imparting additional movement to the trays as one tray passes from under the delivery end of the conveyer and another comes into its place means for regulating the moment of this additional movement, and means for regulating the amount of additional movement imparted substantially as set forth.

3. In a biscuit-making machine the combination of, a source of power, rolls operated from that source of power, conveyers for serving material to the rolls and driven from the same source of power, means for varying the speed of the rolls, means for varying the speed of the conveyers, a cutter, means for operatively connecting the cutter with the source of power, a conveyer for serving material from the rolls to the cutter and carrying it from the same, means for propelling this conveyer from the source of power, a movable "knife-edge" at the delivery end of the conveyer, means for adjusting the position of the knife-edge relatively to the material arranged upon the conveyer, a series of traveling trays coöperating with this conveyer, mechanism operatively connecting the trays with the source of power, means for imparting additional movement to the trays as one tray passes from under the "knife-edge" of the conveyer and another comes into its place, means for regulating the moment of this additional movement, and means for regulating the amount of additional movement imparted substantially as set forth.

4. In a biscuit-making machine the combination of a source of power, rolls operated from that source of power, conveyers for serving material to the rolls and driven from the same source of power, means for varying the speed of the rolls, means for varying the speed of the conveyers, means for operatively connecting the cutter with the source of power, a conveyer for serving material from the rolls to the cutter and carrying it from the same, means for propelling this conveyer from the source of power, a movable "knife-edge" at the delivery end of the conveyer, means for adjusting the position of the "knife-edge" relatively to the material arranged upon the conveyer, means for removing the scrap material from the conveyer as it leaves the cutter, a series of traveling trays coöperating with this conveyer, mechanism operatively connecting the trays with the source of power, means for imparting additional movement to the trays as one tray passes from under the "knife-edge" of the conveyer and another comes into its place, means for regulating the moment of this additional movement, means for automatically raising the knife-edge at the moment this additional movement is imparted and means for regulating the amount of additional movement imparted substantially as set forth.

5. In a biscuit-making machine the combination of, a source of power, rolls operated from that source of power conveyers for serving material to the rolls and driven from the same source of power, means for varying the speed of the rolls, means for varying the speed of the conveyers, means for throwing one set of rolls out of action, a cutter, means for operatively connecting the cutter with the source of power, a conveyer for serving material from the rolls to the cutter and carrying it from the same, means for propelling this conveyer from the source of power, a movable "knife-edge" at the delivery end of the conveyer, means for adjusting the position of the "knife-edge" relatively to the material arranged upon the conveyer, means for removing the scrap material from the conveyer as it leaves the cutter, a series of traveling trays coöperating with this conveyer, mechanism operatively connecting the trays with the source of power, means for imparting additional movement to the trays as one tray passes from under the "knife-edge" of the conveyer and another comes into its place, means for regulating the moment of this additional movement, means for automatically raising the knife-edge at the moment this additional movement is imparted and means for regulating the amount of additional movement imparted substantially as set forth.

6. In a biscuit-making machine the combination of a source of power, rolls operated from that source of power, conveyers serving material to the rolls and driven from the same source of power, means for varying the speed of the rolls, means for varying the speed of the conveyers, a cutter, means for operatively connecting the cutter with the source of power, a conveyer for serving material from the rolls to the cutter and carrying it from the same, means for propelling this conveyer from the source of power, a series of traveling trays coöperating with this conveyer, endless chains carrying these trays, gear-wheels engaging the chains, shafts carrying these gear-wheels, means for operatively connecting one shaft with the source of power whereby a step-by-step movement is imparted to it, a disk mounted upon this shaft, a pawl carried on the face of the disk, a projection upon the shaft adapted to be engaged by the pawl on the disk, an operating-lever secured to the disk, and means for reciprocating this lever and operatively connecting it with the source of power substantially as set forth.

7. In a biscuit-making machine the combination of a source of power, rolls operated from the source of power, conveyers serving material to the rolls and driven from the same source of power, means for varying the speed of the rolls, means for varying the speed of the conveyers, a cutter, means for operatively connecting the cutter with the source of power, a conveyer for serving material from the rolls to the cutter and carrying it from the same, means for propelling this conveyer from the source of power, a series of traveling trays coöperating with this conveyer, endless chains carrying these trays, gear-wheels engaging the chains, shafts carrying these gear-wheels, means for operatively connecting one shaft with the source of power whereby a step-by-step movement is imparted to it, a disk mounted upon this shaft, a pawl carried on the face of the disk, means whereby the position of the pawl relatively to the projection on the shaft may be adjusted, an operating-lever secured to the disk, a shaft mounted parallel to the shaft upon which the disk is mounted, a cam on that shaft, a rod operatively connecting the cam with the operating-lever upon the disk, means whereby that end of the rod which engages the cam may be raised or lowered, and means for keeping this end of the rod in contact with the cam, substantially as set forth.

8. In a biscuit-making machine the combination of a source of power, rolls operated from that source of power, conveyers serving material to the rolls and driven from the same source of power, means for varying the speed of the rolls, means for varying the speed of the conveyers, a cutter, means for operatively connecting the cutter with the source of power, a conveyer for serving material from the rolls to the cutter and carrying it from the same, means for propelling this conveyer from the source of power, a series of traveling trays coöperating with this conveyer, endless chains carrying these trays, gear-wheels engaging the chains, shafts carrying these gear-wheels, means for operatively connecting one shaft with the source of power whereby a step-by-step movement is imparted to it, a disk mounted upon this shaft, a pawl carried on the face of the disk, means whereby the position of the pawl relatively to the projection on the shaft may be adjusted, an operating-lever secured to the disk, a shaft mounted parallel to the shaft upon which the disk is mounted, a cam on that shaft, a rod operatively connecting the cam with the operating-lever upon the disk, means whereby that end of the rod which engages the cam may be raised or lowered, means for keeping this end of the rod in contact with the cam, a shaft mounted parallel to the last two shafts, a cam upon this shaft, a lever connected to the "knife-edge" of the conveyer-band whereby the "knife-edge" may be raised or lowered, an extension to that lever projecting over the cam, a roller carried by a sliding shaft, and means whereby the pawl carried upon the face of the disk is operatively connected with the sliding shaft so that when the pawl is oscillated the shaft is moved endwise and its roller brought between the cam and the lever which raises the "knife-edge" substantially as set forth.

9. In a biscuit-making machine the combination of a source of power, rolls operated from that source of power, conveyers for serving material to the rolls and driven from the same source of power, means for varying the speed of the rolls, means for varying the speed of the conveyers, a cutter, means for operatively connecting the cutter with the source of power, an endless conveyer-band for serving material from the rolls to the cutter and carrying it from the same, a drum whereby one end of the conveyer-band is carried, means for supporting the drum, a movable "knife-edge" whereby the other end of the conveyer-band is carried, adjustable blocks for supporting the "knife-edge," a movable carriage for the blocks, a sling pivoted to a rigid support, a jockey-pulley carried therein and made to bear against the inoperative side of the conveyer-band and mechanism connecting the movable carriage of the "knife-edge" and the jockey-pulley sling whereby the jockey-pulley and "knife-edge" may be simultaneously operated substantially as set forth.

10. In a biscuit-making machine the combination of a source of power, rolls, gearing operatively connecting the rolls with the source of power, conveyers for serving material to the rolls, gearing operatively connecting the conveyers with the source of power, a sling, a support for the sling, means whereby the sling may be made to pivot about its support, a gear-wheel carried by the sling and forming part of the gearing by which one set of rolls with its conveyer is driven, a cutter, means for operatively connecting the cutter with the source of power, a conveyer for serving material from the rolls to the cutter and carrying it from the same; means for propelling this conveyer from the source of power, a movable "knife-edge" at the delivery end of the conveyer, means for adjusting the position of the "knife-edge" relatively to the material arranged upon the conveyer, means for removing the scrap material from the conveyer as it leaves the cutter, a series of traveling trays coöperating with this conveyer, mechanism operatively connecting the trays with the source of power, means for imparting additional movement to the trays as one tray passes from under the "knife-edge" of the conveyer and another comes into its place, means for regulating the moment of this additional movement, means for automatically raising the "knife-edge" at the moment this additional movement is imparted and means for regulating the amount of additional movement imparted, substantially as set forth.

11. In a biscuit-making machine the combination of a source of power, a shaft driven from that source of power, a step gear-wheel mounted on the shaft, a second shaft mounted parallel to the first, a toothed wheel carried thereon, a second toothed wheel carried by a sling from the first wheel and gearing with the latter, means whereby the first gear-wheel with the sling is permitted to slide longitudinally upon the shaft but not to rotate thereon, means whereby the sling may be locked in position and the second gear-wheel brought into mesh with any part of the step gear-wheel, rolls, gearing operatively connecting the second shaft with the rolls, conveyers, for serving materials to the rolls, gearing operatively connecting the second shaft with the conveyers, a sling carrying one of the gear-wheels which form the connection between the two shafts and one set of rolls with its conveyer, a support for the sling, means whereby the sling may be made to pivot about its support, a cutter, means for operatively connecting the cutter with the source of power, means for varying the speed of the cutter, an endless conveyer-band for serving material from the rolls to the cutter and carrying it from the same, a drum, whereby one end of the conveyer-band is carried, means for supporting the drum, a movable "knife-edge" whereby the other end of the conveyer-band is carried, adjustable blocks for supporting the "knife-edge," a movable carriage for the blocks, a sling pivoted to a rigid support, a jockey-pulley carried therein and made to bear against the inoperative side of the conveyer-band, mechanism connecting the movable carriage of the "knife-edge" and the pulley-sling whereby the jockey-pulley and "knife-edge" may be simultaneously operated, means for operating the conveyer-band by a step-by-step movement from the source of power, means for removing the scrap material from the conveyer as it leaves the cutter, a series of traveling trays coöperating with the conveyer, endless chains carrying these trays, gear-wheels engaging the chains, shafts carrying these gear-wheels, means for operatively connecting one shaft with the source of power whereby a step-by-step movement is imparted to it, a disk mounted upon this shaft, a pawl carried on the face of the disk, a projection upon the shaft adapted to be engaged by the pawl on the disk, means whereby the position of the pawl relatively to the projection on the shaft may be adjusted, an operating-lever secured to the disk, a shaft mounted parallel to the shaft upon which the disk is mounted, a cam on that shaft, a rod operatively connecting the cam with the lever upon the disk, means whereby that end of the rod connected to the lever may be raised or lowered, means whereby that end of the rod which engages the cam may be raised or lowered, a shaft mounted parallel to the last two shafts, a cam upon this shaft, a lever connected to the "knife-edge" of the conveyer-band whereby the "knife-edge" may be raised or lowered, an extension to that lever projecting over the cam, a roller carried by a sliding shaft, an extension upon the pawl mounted upon the face of the disk, and mechanism operatively connecting the sliding shaft with this extension of the pawl so that when the pawl is lowered the shaft is moved endwise and the roller brought between the cam and the lever which raises the "knife-edge" substantially as set forth.

In testimony whereof I have signed my name to this specification in the presence of two subscribing witnesses.

GEORGE SAMUEL BAKER.

Witnesses:
 GEO. J. B. FRANKLIN,
 JOSEPH LAKE.